(12) United States Patent
Jenssen

(10) Patent No.: US 6,883,265 B1
(45) Date of Patent: Apr. 26, 2005

(54) EQUIPMENT FOR STORAGE AND TRANSPORT OF LIVING FISH

(76) Inventor: Inge Henning Jenssen, Kveldroveien 9, Tromso (NO), N-9007

( * ) Notice: Subject to any disclaimer, the term of this patent is extended or adjusted under 35 U.S.C. 154(b) by 0 days.

(21) Appl. No.: 10/089,225

(22) PCT Filed: Oct. 4, 2000

(86) PCT No.: PCT/NO00/00326

§ 371 (c)(1),
(2), (4) Date: Jul. 10, 2002

(87) PCT Pub. No.: WO01/24623

PCT Pub. Date: Apr. 12, 2001

(30) Foreign Application Priority Data

Oct. 4, 1999 (NO) .............................................. 994839

(51) Int. Cl.[7] .............................................. A01K 73/02
(52) U.S. Cl. ....................................................... 43/9.1
(58) Field of Search ........................... 43/9.1, 9.2, 9.3, 43/7, 104; 119/203

(56) References Cited

U.S. PATENT DOCUMENTS

| 455,758 | A | * | 7/1891 | Moulsong | 43/44.99 |
|---|---|---|---|---|---|
| 772,360 | A | * | 10/1904 | Jensen | 43/55 |
| 1,841,956 | A | * | 1/1932 | Juergens | 43/55 |
| 2,854,782 | A | * | 10/1958 | Daugherty | 43/55 |
| 2,890,543 | A | * | 6/1959 | Mitchell | 43/9.1 |
| 2,950,557 | A | * | 8/1960 | McDonald | 43/9.1 |
| 3,015,902 | A | * | 1/1962 | Mount | 43/7 |
| 3,150,627 | A | * | 9/1964 | Stewart et al. | 114/74 T |
| 3,178,764 | A | * | 4/1965 | Hebert et al. | 452/100 |
| 3,316,670 | A | * | 5/1967 | Johnson | 43/9.1 |
| 3,509,848 | A | * | 5/1970 | Salmon | 114/245 |
| 3,882,624 | A | * | 5/1975 | Pityo | 43/12 |
| 4,044,432 | A | * | 8/1977 | Ebata | 43/7 |
| 4,158,267 | A | * | 6/1979 | Farnsworth | 43/55 |
| 4,252,081 | A | * | 2/1981 | Smith | 119/223 |
| 4,356,654 | A | * | 11/1982 | Trekel et al. | 43/9.1 |
| 4,637,155 | A | * | 1/1987 | Johnson | 43/7 |
| 5,048,222 | A | * | 9/1991 | Correll | 43/9.1 |
| 5,444,933 | A | * | 8/1995 | Kinoshita et al. | 43/9.7 |
| 5,509,227 | A | * | 4/1996 | Marrero | 43/7 |
| 5,561,936 | A | * | 10/1996 | Franke | 43/7 |

FOREIGN PATENT DOCUMENTS

| FR | 2720225 | * | 5/1994 |
|---|---|---|---|
| GB | 730652 | | 5/1955 |
| GB | 224281 | * | 10/1991 |
| NO | 20850 | | 12/1910 |
| NO | 24069 | | 12/1913 |
| NO | 52761 | | 7/1933 |
| NO | 81500 | | 3/1953 |
| NO | 105955 | | 3/1965 |

* cited by examiner

Primary Examiner—Teri Pham Luu
Assistant Examiner—Jordan Lofdahl
(74) Attorney, Agent, or Firm—Schneck & Schneck; Thomas Schneck; Gina McCarthy

(57) ABSTRACT

A fish bag (1, 1') comprising a netting with bag rings (3) and at the end a second at the end a second netting (4) with purse lines (5, 6) and a towing line (9). One or more braces (9) and locking rings (8) to connect several fish bags (1) into larger units.

25 Claims, 6 Drawing Sheets

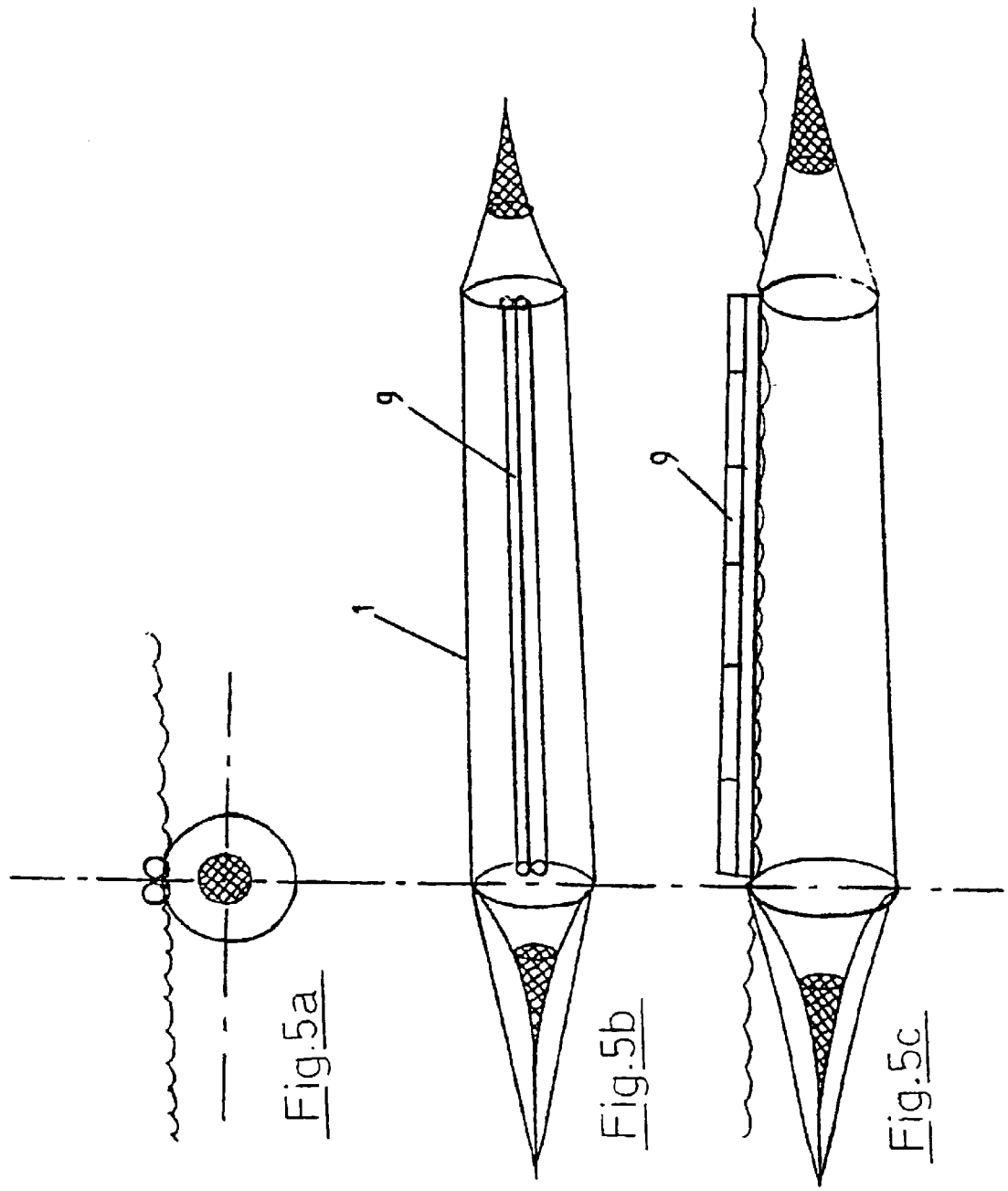

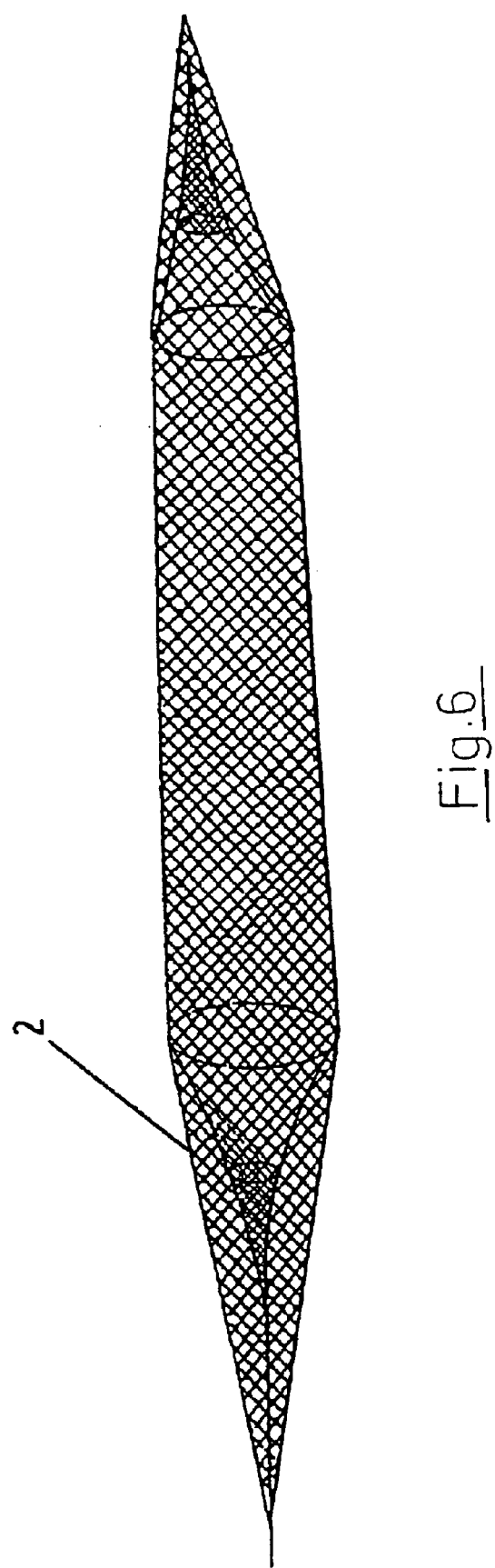

EQUIPMENT FOR STORAGE AND TRANSPORT OF LIVING FISH

The present invention concerns primarily a device for storage and transport of living fish, where the device is sausage-formed and the transport is preferably performed by this being towed after a boat.

The harvesting of the sea in the form of fishing is the largest and oldest business in this country through history. Today the fish export, disregarding the petrol area, is Norway's largest business money-wise, and the assurance of deliveries of products of high quality is of decisive importance for it to remain a large industry also in the future.

There are dumped large quantities of fish because the capacity of transporting it ashore is not present, and it is also not of the proper quality.

There are several factors interacting to determine the quality of the fish and the fish products when they arrive at the consumers somewhere in the world. When the fish die, a process starts in the fish meat giving it a poorer quality. The quality of the fish meat arriving at the consumer may be improved by waiting for the longest possible time before killing the fish so that the degradation process has been going on for as short a time as possible. The further treatment of the fish in the form of processing, refining, storage and transport should be made as short as possible under the most suitable conditions to maintain the quality.

The delaying of the time for the sacrificing of the fish and thus the starting of the decaying process, is a method that has been used in many connections also in former times through history. In seasons with e.g. a good supply of sails and perhaps a lack of capacity in the receiving country, the containment of fish in enclosures has been common. This is done by the fish caught alive being imprisoned in a netting bag being anchored until it is fetched and is hoisted into a supply ship or the netting bag is towed to a receiving plant for fish. Fish that are imprisoned in such an enclosure will be standing very cramped under perhaps poor current conditions, and this stresses the fish, something that again reduces the quality and the fish die.

There are used well supply ships for transporting the fish from the netting enclosures. The well supply ships are equipped with tanks into which there is pumped seawater and wherein fish are kept during their transport and reception. Well supply ships is an expensive solution when considering that in many instances a lot of fish die in the netting is enclosures before the ships collect them, so the economical result of the fish may not be worthwhile in many cases.

In Norwegian patent no. 20.850 there is disclosed a storage unit for live fish comprising floats in both ends and between these a netting-cage for storing fish. Such a solution is suitable for storing fish, is more expensive than required, and does not represent any good solution with respect to transport. The transport of fish in any such device will have its limitation in how fast it may be transported for the fish to survive, and this is not any economically suitable speed for the transport per se.

Norwegian patent no. 81.500 discloses a container for collecting fish from a trawl and for further transport of the collected live fish to a receiving plant and for shorter storage. The collector is tied to a trawling bag and is not regarded as any suitable way to store and transport fish with respect to maintaining quality and avoid fish death.

In addition to the transporting of fish in a more or less hydrodynamic device, fish are transported in netting bags, a keeping netting. The towed keeping netting may not exceed a speed of 2–3 knots, something that is very time-consuming.

Such solutions are disclosed in Norwegian patents nos. 24.069 and 52.761. The former discloses a seine bag being kept extended by a floating body, and a boat pulls the entire device. A speed exceeding 2–3 knots will be stressing for the fish and will create conditions increasing the mortality. In no. 52.761 there is disclosed a somewhat similar device, but here it is emphasised that there exist devices in addition to the seine netting which keep this inflated to avoid it being crushed during transport.

A container for transporting live fish, which also includes a penetrating current of water, appears from Norwegian patent no. 105.955. A penetrating current which may be reduced by one end partly comprising a solid grating or by one end being funnel-shaped. This to reduce the towing resistance and prevent the death of fish.

The purpose of the present invention is to provide a device being suited for storage and transport of live fish for transport velocities far exceeding (10–20 knots) what the fish would endure outside the device, but without it disparaging the environment. The invention has as one of its goals a price so that is will be competitive in view of what exist of transport devices for live fish.

This is achieved by a fish netting being secured in both ends with netting rings, and where at least one end is equipped with one netting and a funnel with a pursing mechanism.

Further details of the invention will be apparent from the disclosure infra of an exemplary embodiment thereof under reference to the figures.

FIG. 5 depicts the invention equipped with a brace and an anchoring of the bag.

FIG. 6 depicts the fish bag during the transport with an additional external netting.

Figure 1:
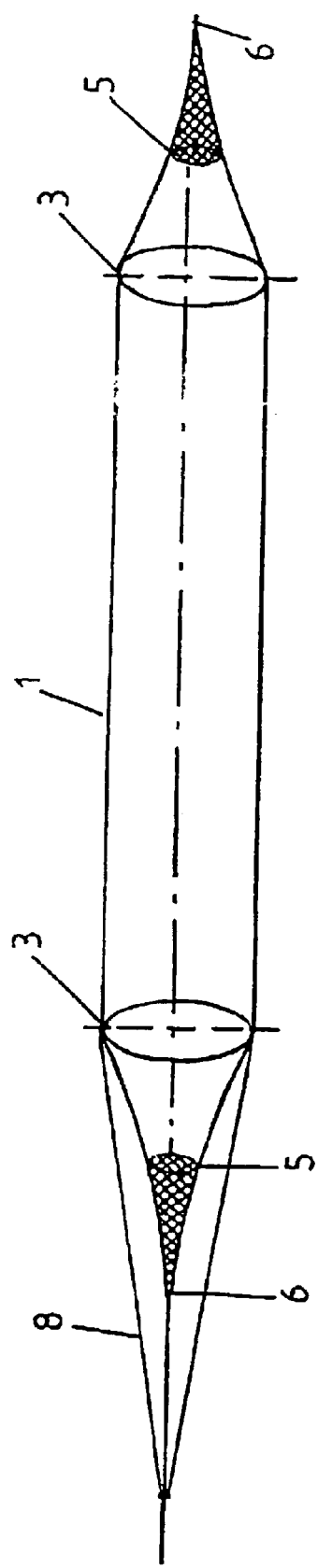
FIG. 1 depicts a basic form of the invention.
Figure 4:
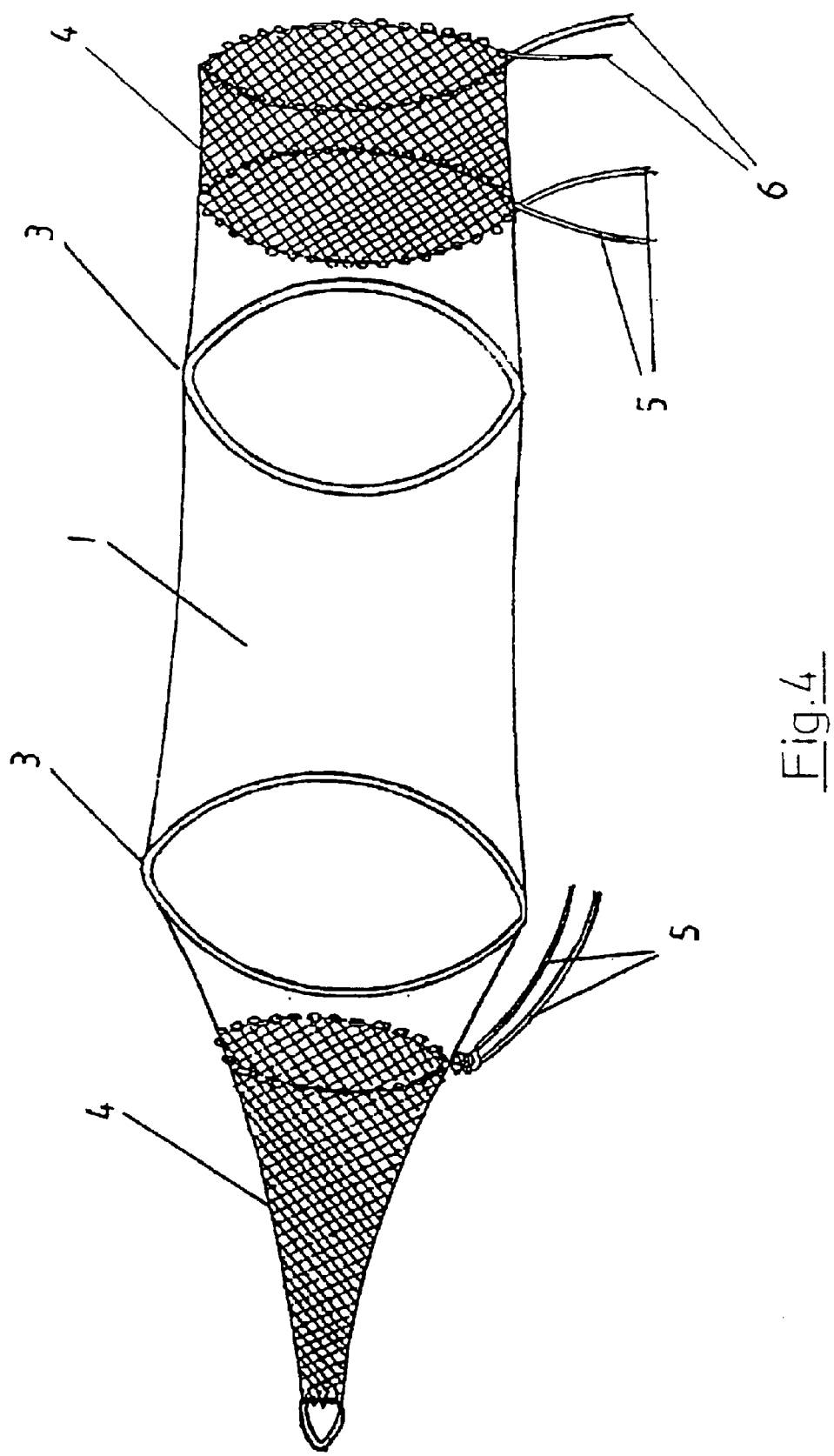
FIG. 4 depicts a detailed view of the outer enclosure according to the invention.

The invention comprises a fish bag 1 being made of strong webbing. If extra strength is wanted during e.g. transport, it is possible to sheath the entire fish bag 1 in a first netting 2. See FIG. 6. The fish bag 1 is tubular and is equipped with a bag ring 3 at both ends somewhat inside the end to keep the tube extended. To the ends of the fish bag 1 there is located a tubular second netting 4. At the transition between the fish bag 1 and the second netting 4, there is located a first purse line 5. A second purse line 6 is located in the second end of the second netting 4. Through these purse lines 5,6 the fish bag 1 may be pursed and be closed at the end so that fish do not escape, but it will be possible to determine and regulate the through-flow of water in the fish bag 1. This is depicted in the FIGS. 1 and 4.

Figure 2:
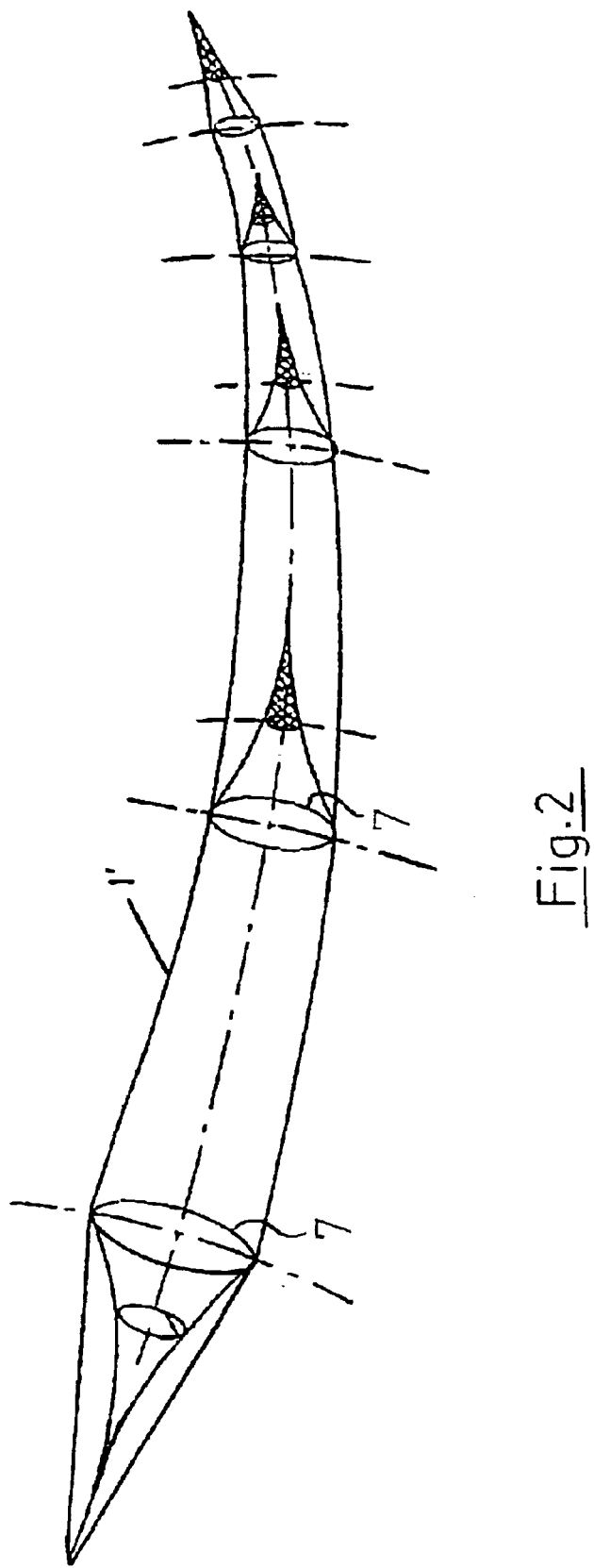
FIG. 2 depicts a connection between several units into larger bags.
Figure 3C:
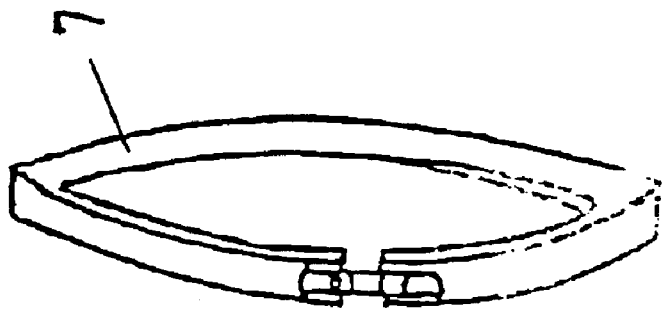
FIG. 3 depicts connective devices for several units into larger bags.
Figure 3B:
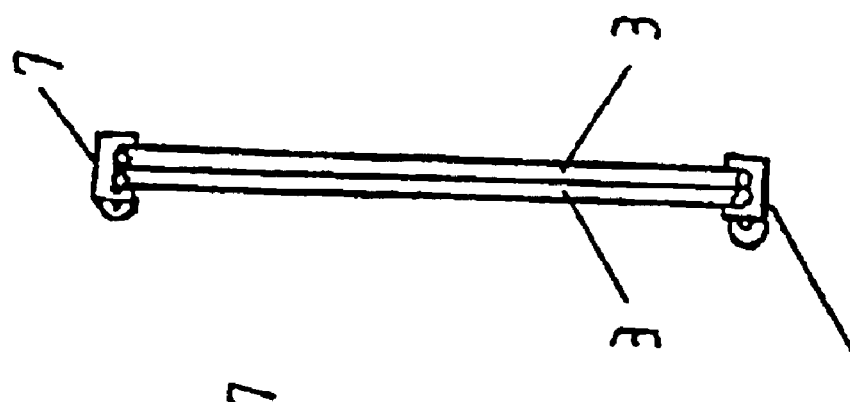
Figure 3A:
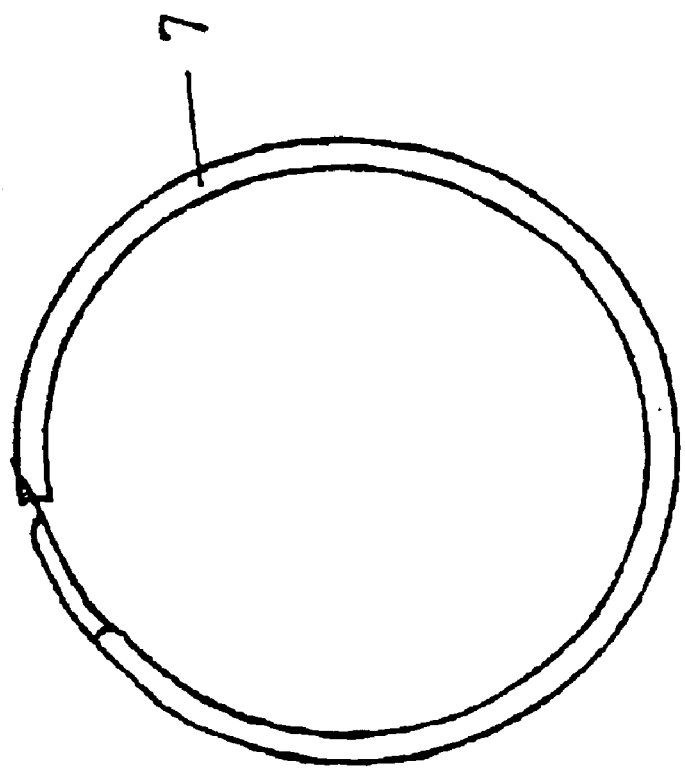

Several fish bags 1 may be connected into larger units as indicated in FIG. 2. The connection is performed by the bag rings 3 from fish bags 1 being placed adjacent to one another and being interconnected through a locking ring 7. See FIG. 3. In the connection there will thus be present such funnel-shaped units, one from each fish bag 1. When the fish bag 1,1' is to be towed behind a boat, extra towing lines 8 between the boat and the bag ring 3 may be applied.

During transport of fish in the fish bag 1,1' the first purse line 5 is closed and the second purse line 6 is completely closed so that flow-through of water is made suitably rapid and comfortable for the fish. The fish bag 1 may be transported at great speed to its destination without the fish becoming injured or dead.

By employing the present invention fish may be towed ashore and may be stored live until the reception obtains the required capacity or until the market offers the required price. Furthermore, the fish may be towed alive as close as possible to the relevant market prior to it being slaughtered.

According to reports from the Ministry of Fishery a larger number of receptacles for fish along the coast will be closed within a short time. This means a longer transport for delivery of fish and a larger need for transport of the fish alive for maintaining its quality.

When maintaining the fish bag 1,1' in the sea for live storage of the fish, there may along the fish bag 1,1' be located braces 9 in the form of e.g. pipes. See FIG. 5. These may also function as a scaffolding for persons caring for the fish. The fish bag 1 may be equipped with current providers in the form of motorised propellers to obtain the required through-flow of water when the fish bag 1 is stationary, e.g. in the capacity of a fish farming plant.

What is claimed is:

1. Device for storing and transporting live fish, comprising:
   a fish bag;
   a first and a second bag ring positioned within said fish bag such that said fish bag retains its shape;
   a netting means at a first and a second end of said bag said netting means allowing water to flow into said fish bag during transport; and
   a means for controllably reducing an opening of said netting means at a location between said fish bag and said netting means to allow transport of fish in said device.

2. Device for storing and transporting live fish according to claim 1, wherein several fish bags are coupled together through locking rings located at the site of the bag rings.

3. Device for storing and transporting live fish according to claim 1, wherein at one end of the fish bag there are located towing lines.

4. Device for storing and transporting live fish according to claim 1, wherein there is applied at least one brace to the fish bag.

5. Device for transporting and storing live fish according to claim 1, wherein around the fish bag there is located a first netting.

6. Device for storing and transporting live fish according to claim 1, wherein said fish bag includes a tubular webbing material.

7. Device for storing and transporting live fish, comprising a fish bag in the form of a tubular webbing material, the tube having at both ends bag rings, outside of which bag rings and at each end of the tube there being arranged an open netting equipped with purse lines for adjusting the flow-through of water in the device by narrowing an opening wherein several fish bags are coupled together through locking rings located at the site of the bag rings.

8. Device for storing and transporting live fish according to claim 7, wherein at one end of the fish bag there are located towing lines.

9. Device for storing and transporting live fish according to claim 7, wherein there is applied at least one brace to the fish bag.

10. Device for storing and transporting live fish according to claim 7, wherein around the fish bag there is located a fish netting.

11. Device for storing and transporting live fish according to claim 7, wherein said fish bag includes a flexible material.

12. Device for storing and transporting live fish comprising a tubular bag formed from a webbing material, a bag ring at each end of said tubular bag, outside of each bag ring and at each end of the tubular bag there being arranged a netting equipped with first and second purse lines, said first purse line disposed at a transition between said netting and webbing material of said tubular bag and said second purse line disposed at an end of said netting, said purse lines being adjustable to adjust the flow-through of water in said device.

13. Device for storing and transporting live fish according to claim 12, said second purse line being completely closed during transport.

14. Device for storing and transporting live fish according to claim 12, wherein said nettings are funnel shaped.

15. Device for storing and transporting live fish according to claim 12, wherein several fish bags are coupled together through locking rings located at the site of the bag rings.

16. Device for storing and transporting live fish according to claim 12, wherein at one end of the bag there are located towing lines.

17. Device for storing and transporting live fish according to claim 12, wherein there is applied at least one brace to the bag.

18. Device for storing and transporting live fish according to claim 12, wherein around the bag there is located a fish netting.

19. Device for storing and transporting live fish according to claim 1 further comprising means for preventing escape of fish at an outer end of said netting means, said means for controllably reducing an opening of said netting means disposed at an inner end of said netting means.

20. A device for storing and transporting live fish, comprising:
   a tubular bag;
   a netting having an adjustable opening at an inner end of said netting, said netting arranged outside of said tubular bag;
   means for regulating a flow of water through said tubular bag, said means disposed at a transition between said netting and said tubular bag, said means for regulating operable to adjust said netting opening; and
   means for preventing escape of said live fish at an outer end of said netting.

21. The device of claim 20 wherein said netting is a first netting arranged outside of one end of said tubular bag.

22. The device of claim 21 further comprising a second netting arranged outside of another end of said tubular bag.

23. The device of claim 22 wherein said second netting is closeable.

24. The device of claim 22 wherein said second netting is closed at one end.

25. The device of claim 20, wherein said means for regulating a flow of water is a purse line.

* * * * *

UNITED STATES PATENT AND TRADEMARK OFFICE
CERTIFICATE OF CORRECTION

PATENT NO.        : 6,883,265 B1
APPLICATION NO.   : 10/089225
DATED             : April 26, 2005
INVENTOR(S)       : Inge Henning Jenssen It is certified that error appears in the above-identified patent and that said Letters Patent is hereby corrected as shown below:

On the Title Page Item (57) Abstract, second line:

... at the end a second at the end a second netting (4) with purse ...

should read: -- at the end a second netting (4) with purse... --

Signed and Sealed this

Thirteenth Day of May, 2008

JON W. DUDAS
*Director of the United States Patent and Trademark Office*